United States Patent [19]

Hanagan

[11] Patent Number: 5,033,449
[45] Date of Patent: Jul. 23, 1991

[54] ELECTRONIC GRILL CONTROL

[75] Inventor: Joseph J. Hanagan, Freeport, Ill.

[73] Assignee: The Thermos Company, Inc., Freeport, Ill.

[21] Appl. No.: 337,364

[22] Filed: Apr. 13, 1989

[51] Int. Cl.$^5$ ............................................. F24C 3/00
[52] U.S. Cl. ............................ 126/39 BA; 126/41 R; 126/25 A; 73/296; 99/385
[58] Field of Search ............ 126/39 BA, 41 R, 41 D, 126/25 A; 73/296; 177/173, 245, 225, 45, 46, 47; 99/391, 340, 390, 325

[56] References Cited

U.S. PATENT DOCUMENTS

| | | |
|---|---|---|
| 3,194,227 | 7/1965 | Beach et al. . |
| 3,454,346 | 7/1969 | Genbauffe . |
| 3,877,457 | 4/1975 | Doner . |
| 3,959,620 | 5/1976 | Stephen, Jr. . |
| 4,125,357 | 11/1978 | Kristen et al. . |
| 4,245,505 | 1/1981 | Bayner .......................... 126/41 R X |
| 4,302,181 | 11/1981 | Schlosser . |
| 4,341,197 | 7/1982 | Butts . |
| 4,391,265 | 7/1983 | Chen . |
| 4,413,515 | 11/1983 | Quinn ................................ 126/41 R |
| 4,492,336 | 1/1985 | Takata et al. . |
| 4,524,617 | 6/1985 | Krehel et al. ................. 126/41 R X |
| 4,561,418 | 12/1985 | Cairns ................................ 126/41 R |
| 4,601,279 | 7/1986 | Guerin . |

Primary Examiner—Larry Jones
Attorney, Agent, or Firm—Harness, Dickey & Pierce

[57] ABSTRACT

The electronic grill control employs a microprocessor-based circuit which monitors cooking temperature, cooking time, fuel level and the presence or absence of flame. The fuel level may be displayed alternately as a percentage or fraction of the full tank capacity or in terms of the burning time remaining in the tank. A dual electrode ignition circuit eliminates noise problems in the microprocessor circuitry by establishing the appropriate sparking voltage between the two electrodes instead of between a single electrode and the casting ground. A fuel presence sensor comprising one of the two electrodes measures resistance or conductance of the ionized gases within the flame to provide the microprocessor with an indication that the flame has failed to ignite or has blown out. All information is displayed on an alphanumeric display with audible alarms provided for certain conditions.

9 Claims, 5 Drawing Sheets

ELECTRONIC GRILL CONTROL

BACKGROUND AND SUMMARY OF THE INVENTION

The present invention relates generally to barbecue grills and more particularly to an electronically controlled barbecue grill employing a microprocessor-based electronic circuit for monitoring fuel status, cooking time and temperature and for monitoring and controlling electronic ignition. The electronic circuit includes a human-readable display and comprises a compact and fully integrated, battery-powered control package which affords great convenience and high reliability.

One popular style of conventional barbecue grill in use today employs a containment casting with a gas burner assembly disposed therein and supplied with fuel stored under pressure in a replaceable or refillable canister. Typically, a manually adjustable fuel supply valve is interposed between canister and burner to allow the user to adjust the height of the flame and the cooking temperature. Normally a mating lid is hingedly attached to the casting for use in covering the grill cooking surface and for defining an oven space beneath the lid and within the casting. Some barbecue grills of this type have an analog thermometer of the bimetal type attached to the lid to allow the user to determine the temperature within the oven space, when the lid is closed. In addition, some models may include a pushbutton operated electronic ignition. In use, the user adjusts the gas valve to establish fuel flow into the burner and then depresses the electronic ignition button, causing a momentary spark to ignite the fuel at the burner.

The present invention affords a great deal of convenience not found in conventional barbecue grills. The invention employs a microprocessor-based electronic circuit which monitors and controls various functions of the grill.

A canister weighing system with electronic output provides the data used by the microprocessor to determine the quantity of fuel remaining. The microprocessor displays the quantity of fuel remaining either as a numerical fractional value, or in terms of remaining burning time, based on a calculation performed by the microprocessor. The electronic circuit also includes means for user input of a desired cooking time. The microprocessor circuit includes a real time clock for comparison with the desired cooking time to provide an alarm when the desired cooking time has elapsed. In addition, the desired cooking time is compared by the microprocessor with the remaining burning time for the fuel within the canister. If the microprocessor determines that the fuel remaining in the canister is insufficient to complete the desired cooking time, a notification of the low fuel condition is automatically displayed when the desired cooking time is first entered. This provides the user ample opportunity to fill or replace the fuel canister before beginning to cook. The microprocessor also automatically warns of a low fuel condition when the quantity of fuel drops below ⅛ of the full level.

The electronic circuit also includes an automatic electronic ignition control which may be initially activated by the user, simply by turning the gas supply valve to its fully on position. A first ignition event occurs in response to manual actuation, causing the electronic ignition device to be actuated. An electronic flame sensing device monitors whether a flame is produced in response to the ignition event. If a flame is not present after the first ignition event, the electronic circuit automatically causes one or more subsequent ignition events to occur, without further human interaction, in an effort to ignite the burner. After a predetermined number of attempts at ignition, if no flame is produced, an error message is displayed and an audible alarm is sounded to allow the user to correct the problem or attempt to light the burner manually with a match.

The same flame sensing apparatus continues to monitor the flame even after ignition and the electronic circuit automatically initiates a reignition cycle if the flame is extinguished. This might occur, for example, if a strong wind were to blow out the flame.

Anytime the electronic circuit is unable to ignite or reignite the flame after a predetermined number of tries an error message is displayed, giving the most likely cause of the problem, the principal reasons being inadequate fuel or insufficient battery energy to cause an ignition spark. Accordingly, the control circuit monitors fuel level and battery voltage to provide the appropriate "Fuel Out" and "Low Battery" messages.

The electronic control circuit also employs a thermistor sensor attached to the mid-rear portion of the lower containment casting. The thermistor provides an electrical signal indicative of the cooking temperature. The microprocessor-based control circuit can display the temperature on the integral display device located on the front console. This same display device is also used to display the fuel status messages, electronic timer messages and error messages, when appropriate.

In one user-selected mode the microprocessor cycles various information onto the display device in a rotating sequence. In this fashion, fuel level, fuel time, cooking temperature and cooking time are sequentially displayed.

For a more complete understanding of the invention, its objects and advantages, reference may be had to the following specification and to the accompanying drawings.

DESCRIPTION OF THE PREFERRED EMBODIMENT

Figure 1:
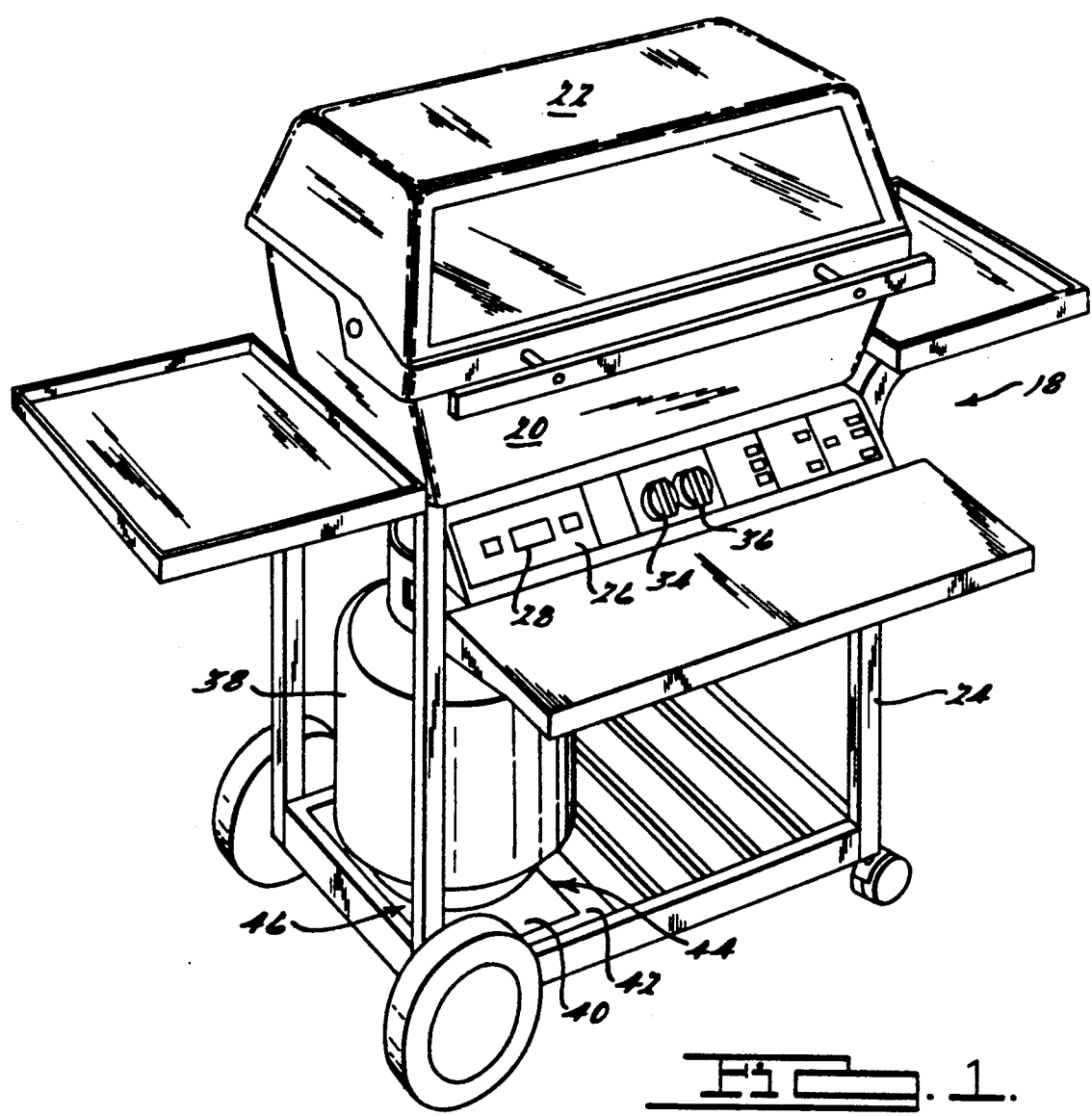
FIG. 1 is a perspective view of a barbecue grill in accordance with the invention.

Referring to FIG. 1, a grill in accordance with the invention is illustrated generally at 18. The grill comprises a lower containment casting 20, an upper hingedly attached lid 22 and preferably a supporting framework 24 on which the lower casting rests. Secured to the framework generally beneath casting 20 is a console 26 behind which many of the components of the electronic grill control circuitry are located. Visible on the front of console 26 is an alphanumeric display on which human-readable information may be displayed. In the presently preferred embodiment this display 28 comprises a liquid crystal display, although other types of displays are also usable. To the left of display 28 is the "Display" push-button 30 and to the right is "Set Time" push-button 32. Preferably bush-buttons 30 and 32 are implemented using membrane switches. The functions of these push-button will be described below.

Also positioned on console 26 are the fuel supply valves 34 and 36. The embodiment illustrated employs a burner having left and right portions which are independently controllable by valves 34 and 36, respectively. Turning the right valve 36 to its fully on (fully clockwise) position initiates the flame ignition sequence described below.

Fuel source canister 38 is disposed beneath casting 20 and generally within the confines of framework 24, as illustrated. Fuel source canister 38 rests upon a generally horizontal supporting platform 40. This platform is hingedly attached to the generally horizontal mounting plate 42 in turn supported by framework 24. Platform 40 is hingedly attached to plate 42 for pivotal movement about an axis generally parallel with the innermost front-rear extending edge 44 of platform 40.

Figure 3:
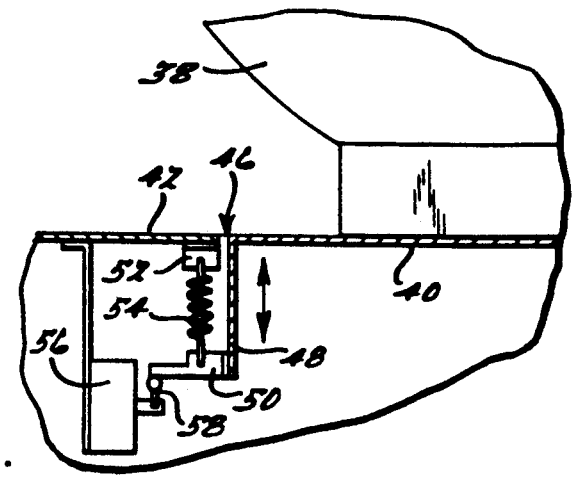
FIG. 3 is a partial horizontal cross-sectional view illustrating the presently preferred weighing mechanism for determining fuel quantity.

With momentary reference to FIG. 3, the canister 38 and platform 40 are illustrated in greater detail, showing the outermost front-rear edge 46. As illustrated, platform 40 has a downturned flange 48 with outwardly extending bracket 50. Plate 42 is also provided with a bracket in generally vertical alignment with bracket 50. A bias spring 54 is secured between brackets 50 and 52, serving to support edge 46 of platform 40 so that platform 40 is generally horizontal.

The spring-loaded platform serves as a weighing scale wherein the weight of canister 38 and any fuel contained therein acts against the bias spring force of spring 54. Depending on the weight of the canister and fuel, edge 46 will be displaced relative to the plate 42, the amount of displacement being proportional to the combined weight of the canister and fuel. A linear slider-type potentiometer 56 is coupled via linkage 58 to bracket 50. Thus the amount of displacement of the edge 46 relative to plate 42 may be related to the potentiometer slider setting. By applying a voltage and measuring the voltage drop across potentiometer 56, the amount of displacement, and hence the combined weight of canister and fuel can be determined and made available to the microprocessor circuit. Linkage 58 may either be pivotally connected or slidably connected between potentiometer slider and bracket 50 to allow for the slight arcuate trajectory of bracket 50 as it rotates about the pivotal axis.

Figure 2:
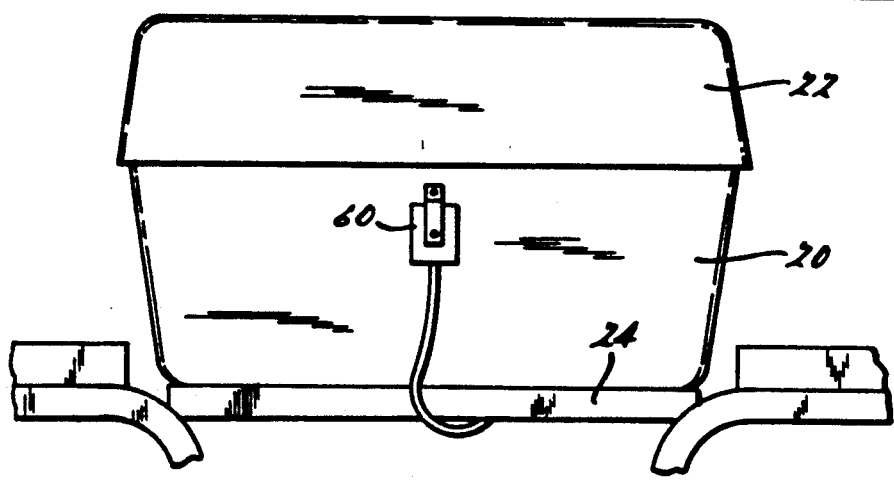
FIG. 2 is a fragmentary rear view of the grill, showing placement of the temperature sensor thermistor.

Referring now to FIG. 2, the presently preferred location of temperature sensing thermistor 60 is illustrated at the rear side of lower casting 20, generally in the middle near the top rim thereof.

Figure 4:
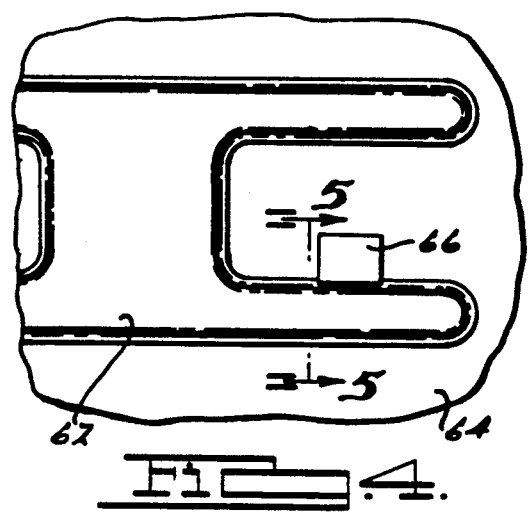
FIG. 4 is a top view of the burner assembly, illustrating placement of the electronic ignition and flame sensing package.
Figure 6:
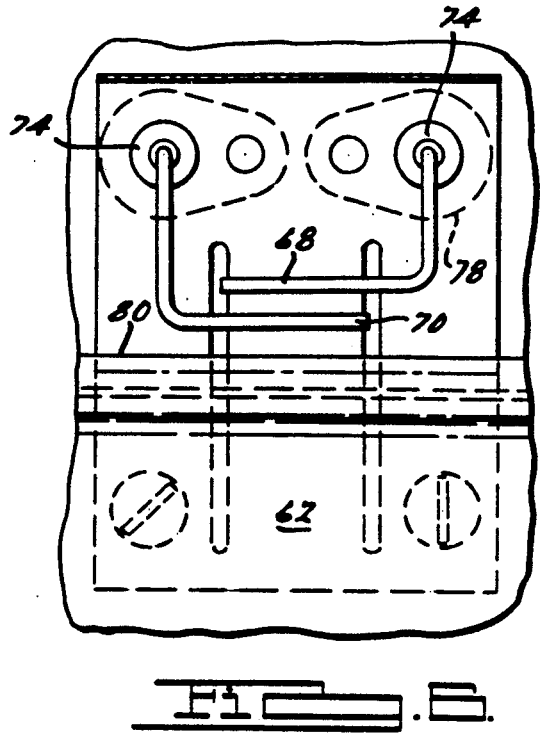
FIG. 6 is a cross-sectional view taken substantially along the line 5—5 of FIG. 5, illustrating yet another view of the ignition and flame sensing package.
Figure 5:
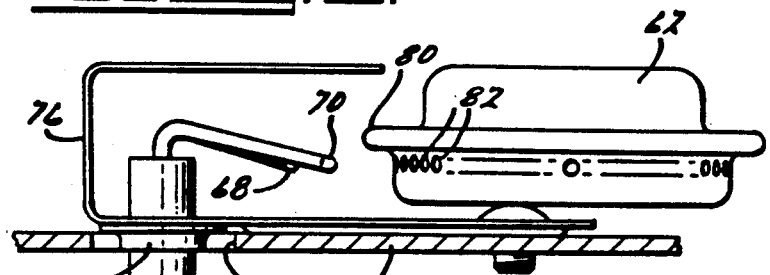
FIG. 5 is a cross-sectional view taken substantially along the line 5—5 of FIG. 4, illustrating the ignition and flame sensing package and its relationship to the burner assembly in greater detail.

FIG. 4 illustrates the burner assembly 62 in relation to the casting floor 64. The ignition and flame sensing package 66 is also illustrated in the presently preferred position. As seen in FIGS. 5 and 6, the ignition and flame sensing package comprises a pair of spaced-apart and generally parallel electrodes, namely first electrode 68 and second electrode 70. Both electrodes pass through an aperture 72 in casting floor 64. Both are provided with ceramic insulators 74. Both ceramic insulators are secured to an elongated U-shaped protective cover by means of ferrules 78. Electrodes 68 and 70 includes portions which are generally parallel to the edge 80 of burner 62.

During an ignition event a high voltage potential is developed between electrodes 68 and 70, causing a spark to jump between the electrodes to ignite the fuel emanating from burner 62. Typically, the electrical potential difference between electrodes is on the order of 20,000 volts. The dual electrode ignition system employed by the invention represents a significant improvement over single electrode systems, particularly since the ignition system is used in conjunction with a microprocessor control circuit.

In single electrode systems a voltage potential is developed between the electrode and the burner, which is grounded to the casting. The casting, however, is not fully grounded, since the supporting framework may be resting upon nonconductive plastic or rubber wheels, or upon nonconductive wooden patio decks for example. The effect of a 20,000 volt ignition spark causes transient electrical impulses or voltage spikes to undesirably appear in the microprocessor power supply. Such impulses or spikes present a significant problem in that they can damage delicate electronic circuitry and can cause the microprocessor to incorrectly process information, frequently resulting in a lock-up condition in which the battery power must be completely removed and then re-established in order to bring the microprocessor circuit back into operation.

The present invention employs a dual electrode ignition system in which the spark is caused to jump from one electrode to the other, rather than from one electrode to the chassis ground. Both electrodes are heavily isolated from the microprocessor power supply, thereby effectively eliminating unwanted voltage spikes, impulses or other transients.

The ignition and flame sensing package 66 also functions to sense the presence or absence of flame at the burner. This is accomplished by measuring the relative impedance of the air space in the vicinity immediately adjacent the burner jets. The burner jets are indicated at 82 in FIG. 5. Flame sensing is accomplished by applying a known reference voltage to electrode 70 and by then measuring with an impedance bridge the amount of conductance between electrode 70 and the burner 62. When no flame is present the impedance is quite high, resulting in no conductance between electrode 70 and burner 62. However, with a flame present the gaseous constituents of combustion, principally ions, serve to significantly lower the impedance and permit conductance between electrode 70 and burner 62. Accordingly, when no flame is present the voltage on probe 70 will be equal to the fixed reference voltage. With a flame present the voltage at probe 70 will drop appreciably, approaching the potential (ground) at burner 62. This voltage drop is monitored by the electronic control circuitry to derive a flame signal indicative of the presence or absence of flame.

Figure 7:
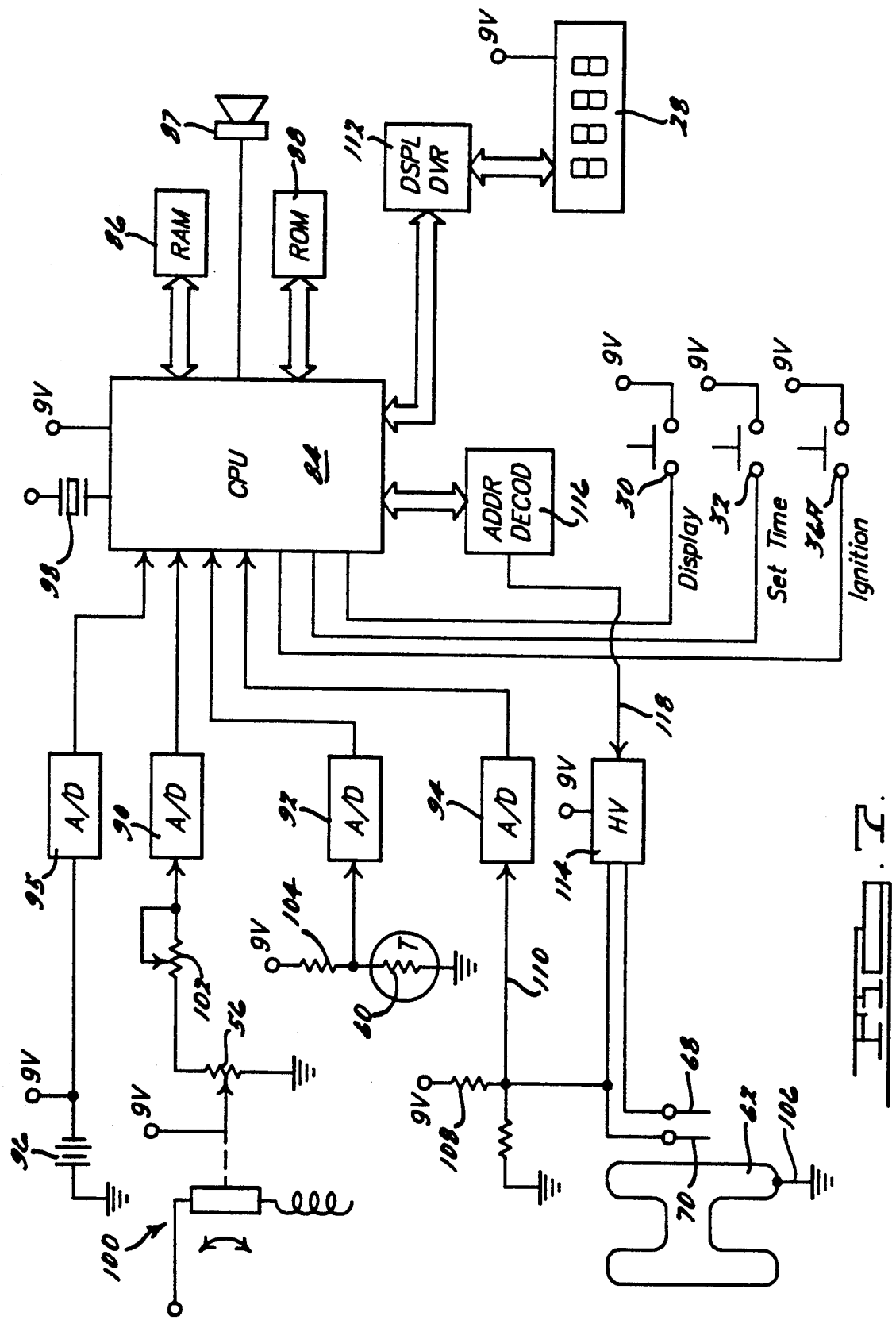
FIG. 7 is an electronic circuit diagram of the control circuit of the invention.

Referring now to FIG. 7, the electronic circuit of the invention is illustrated in schematic block diagram form. The presently preferred embodiment utilizes a microprocessor-based circuit and may be implemented using any one of a number of commercially available microcontrollers.

With reference to FIG. 7, the microprocessor-based circuit includes a microprocessor or CPU 84 to which random access memory RAM 86, read-only memory ROM 88 and an audible annunciator or speaker 87 are attached. The microprocessor 84 is coupled to alphanumeric display 28 via a display driver 112. Four analog to digital conversion channels are used to handle input data from the fuel weighing mechanism (A to D converter 90), from the temperature thermistor (A to D converter 92), from the flame presence sensor (A to D converter 94) and from the battery voltage monitor (A to D converter 95). The circuit is powered by a battery of suitable voltage, preferably a 9 volt battery 96. If necessary the battery 96 may be supplemented with appropriate voltage doubling circuits and voltage regulator circuits (not shown) in order to provide different supply voltages as may be required for a particular microprocessor or for a particular alphanumeric display 28. For purposes of explaining the principles of the invention, a simple 9 volt power supply employing battery 96 has been illustrated.

In accordance with conventional practice CPU 84 is attached to an external timing source such as crystal 98. This timing source is used to maintain a stable clock for microprocessor operation. The CPU 84 uses this clock to derive a suitable timer clock for measuring elapsed cooking times and for controlling other cyclic operations of the master control program stored in ROM 88.

The fuel level sensor, as explained above, relies upon weighing of the canister and fuel. In FIG. 7 the spring-loaded weighing mechanism is indicated generally at 100. The weighing mechanism is connected to potentiometer 56 as previously described. This potentiometer is in turn connected to a calibration potentiometer 102 and the output of calibration potentiometer 102 is supplied to A to D converter 90. In use, an empty canister is placed on weighing mechanism 100 and calibration potentiometer 102 is adjusted to produce an "Empty" reading on display 28. This setting of potentiometer 102 calibrates the system by providing microprocessor 84 with a reference voltage indicative of an empty canister.

Thermistor 60 is attached to A to D converter 90 for providing an indication of the temperature. As illustrated, the thermistor is coupled to a suitable pull-up resistor 94 such that thermistor 60 and pull-up resistor 94 act as a voltage divider network, with the output voltage being indicative of temperature.

A similar arrangement is provided for flame sensing. The flame sensing probe 70 is illustrated in spaced relation to the burner assembly 62, which is grounded as at 106. A pull-up resistor 108 is attached to analog to digital converter 94 along with probe 70. When the impedance between probe 70 and burner 64 is high (flame absent) the voltage applied to analog to digital converter 94 is at a high level. With a flame present, ionization of the gaseous constituents of the flame causes the impedance between probe 70 and burner 62 to drop, thereby substantially lowering the voltage applied to analog to digital converter 94. This change in voltage is sensed by microprocessor 84 and used as an indication of the presence or absence of flame. Although an analog to digital converter 94 is used in the illustrated embodiment, the presence and absence of flame is a sufficiently digital (yes/no) concept that the analog to digital converter may be dispensed with if the additional analog to digital converter is not readily available on the selected microcontroller package being used. In this instance, the analog to digital converter may be eliminated with line 110 being supplied directly to one of the data inputs of microprocessor 84.

In order to provide the electronic ignition control, microprocessor 84 is coupled to a high voltage generator circuit 114, such as a capacitor discharge circuit or flyback circuit. Specifically, microprocessor 84 is coupled to the high voltage circuit by means of an address decoder circuit 116. The address decoder circuit monitors the address bus of the CPU. When a predefined address is placed on the address bus, decoder 116 detects this and outputs a control signal on line 118. The control signal is an on/off signal which triggers the high voltage circuit, causing approximately 20,000 volts to be placed across probes 68 and 70.

Commands from the user are input via push-buttons 30 and 32. The ignition signal is provided by ignition switch 36A, which is mechanically integrated with supply valve 36 to operate when that valve is turned fully on. All switches communicate with microprocessor 84 via its data input bus.

Figure 8:
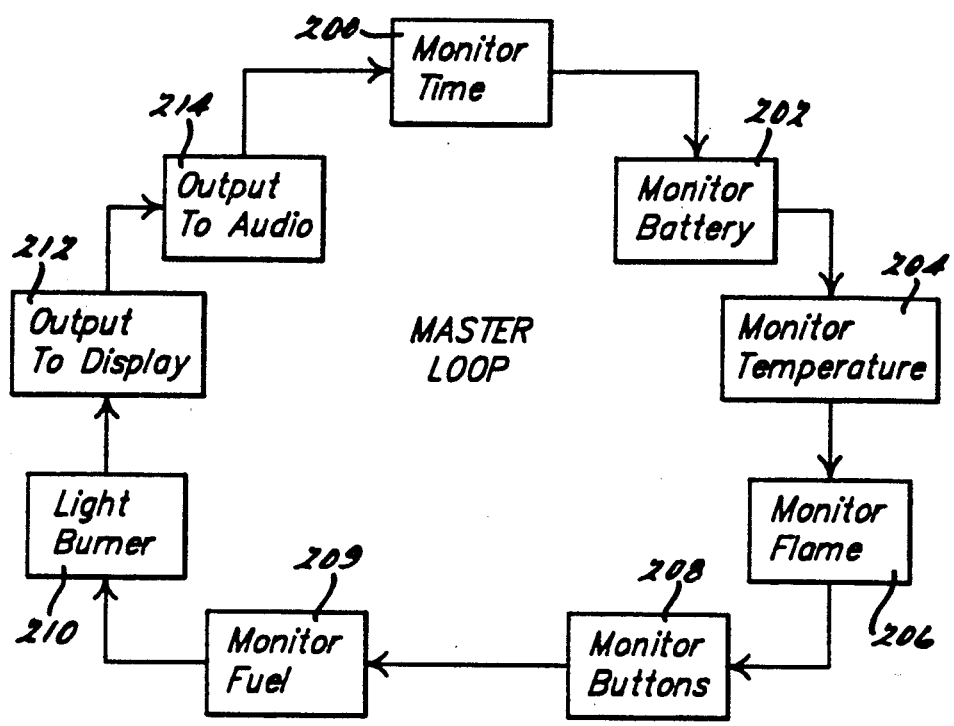
FIG. 8 is a flow chart describing the master control loop executed by the microprocessor in implementing the invention.

The software program under which microprocessor 84 operates is illustrated in FIGS. 8, 9, 10 and 11. These software program routines are stored in ROM 88. Any variables such as elapsed time and temperature are stored in system RAM 86. Software flags which store binary (yes/no) settings are also stored in ROM 88. These variables and flags are listed in Table I below. In essence, the microprocessor 84 is preprogrammed to execute a never-ending loop or circular queue of program instructions, designated generally as the Master Loop, illustrated in FIG. 8. With reference to FIG. 8, the Master Loop performs a series of different functions, one after the other, in a cyclical fashion. Although these functions have been designated in a particular sequence in FIG. 8, it will be understood that the order is not generally significant and that other sequences are also possible in implementing the invention.

TABLE I

| Variables | Flags |
|---|---|
| 1. Time | 1. Low Battery |
| 2. Fuel Level | 2. Flame Presence |
| 3. Temperature | 3. Set Timer - Cycle Fast |
| 4. Display Button State | 4. Ignition Switch Closed |
| (a) Fuel in Tank | |
| (b) Hours in Tank | |
| (c) Timer Setting | |
| (d) Temperature | |
| (e) Scan Display | |

Referring to FIG. 8, the Master Loop cycles through a series of "Monitor" steps, such as monitor time 200, monitor battery 202, monitor temperature 204, monitor flame 206, monitor push-buttons 208 and monitor fuel 209. In essence, these Monitor steps are the data input steps performed by microprocessor 84. The monitor time routine, for example, updates a running clock value stored in RAM memory which is used to determine the elapsed cooking time. As will be explained in connection with the set time button, the user inputs a desired cooking time in terms of hours and minutes. This value is stored in memory as a variable. The monitor time routine decrements the stored value in accordance with the number of internal clock cycles that have elapsed since the last time variable update. In this regard, microprocessor 84 has the conventional capability to maintain an accurate elapsed time clock by dividing the CPU by an appropriate number to obtain minutes and hours.

The monitor battery step utilizes analog to digital converter 95 to measure the battery voltage and to determine whether the battery is below a predetermined appropriate operating voltage. If the monitor battery step determines that the voltage is low, a low battery flag is set in RAM 86 for use by the display handling routine described below.

The monitor temperature routine likewise monitors the output of thermistor 60 and stores a digital numerical value indicative of the measured temperature in a variable in RAM 86.

The monitor flame step 206 similarly monitors the voltage drop between probe 70 and ground, as discussed above. A flame presence flag is set or reset in RAM 86 depending upon whether the burner is lit or not.

The monitor buttons routine 208 polls both Display button and Set Time button to determine whether the user has depressed either. Because the Master Loop operates at a sufficiently high speed, the monitor buttons routine 208 occurs with such rapid frequency that microprocessor 84 appears to respond to the button depress with no apparent delay. The monitor buttons functions are further described in the flowcharts of FIGS. 9 and 10 discussed below. Essentially, however, the data input by the user depressing these buttons causes information to be stored in a display button state variable comprising five individual flags, one for each button state in RAM 86 for use by the remainder of the Master Loop program.

The monitor fuel routine 209 is similar to the monitor temperature routine, in that the fuel level is determined via potentiometer 56 reading and stored as a fuel level variable in RAM 86.

The Master Loop program, in addition to handling data input, also controls the functioning of the electronic grill control in accordance with the data that have been input. For example, the Master Loop includes a light burner routine to 10 which is responsible for causing ignition events to occur. The light burner routine is described more fully via FIG. 11 and is further discussed below. As will be described, the light burner routine accesses the flame lit flag which is set and reset by the monitor flame routine 206.

Similarly, the output to display routine 212 is responsible for providing the appropriate message on alphanumeric display 28. In the event of an error condition resulting from the burner failing to light, routine 212 will display the appropriate message indicating the most likely reason for failure, such as low battery or low fuel. Absent an error condition, the output to display routine 212 displays the data selected by the user for display. The user having made a selection which is handled by the monitor buttons routine 208, the output to display routine will display the desired parameter such as fuel remaining in tank, hours remaining in tank, timer setting, temperature, or a scan among all of these.

In the event of error conditions described above an audible alarm is produced through speaker annunciator 87. The output to this audible alarm is performed by step 214, which monitors the flame lit flag to alert the user when the flame has failed to light after the predetermined number of ignition attempts or in the event the flame is blown out. In addition, as a further convenience to the user, the output to audio routine 214 also monitors the temperature variable and sounds a predetermined tone when the temperature reaches 400° F., the presently preferred preheating temperature. This preheating tone alerts the user when the grill is sufficiently warmed up to begin most grilling processes.

Figure 9:
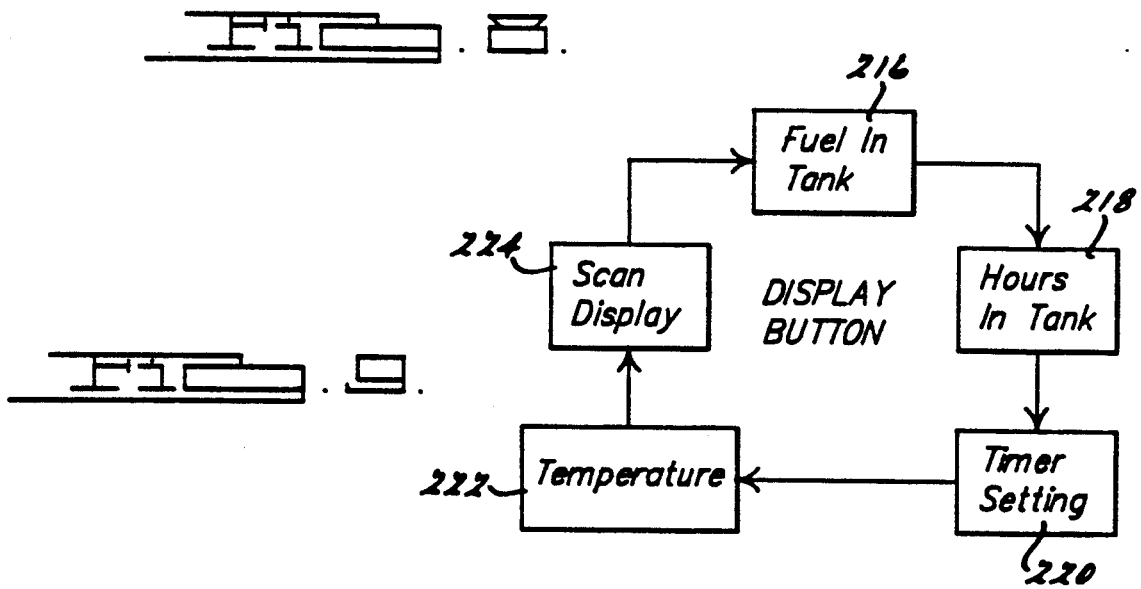
FIG. 9 is a flow chart depicting the function of the Display button in accordance with the invention.

Referring now to FIG. 9, the display button routine which forms a portion of the monitor buttons routine 208 is illustrated. Essentially, each time the user depresses the display button, the display mode steps from one mode to the next. For example, if the system commences in a mode displaying the quantity of fuel remaining in the tank (step 216), depressing the display button once will cause the mode to shift to step 218 where the hours of burning time remaining in the tank are displayed. Depressing the display button again displays the timer setting at step 220. Depressing the button once again displays the temperature at step 222. When the button is again depressed a scan mode 224 is entered. In the scan mode the output to display routine 212 causes the display to cycle sequentially, displaying fuel in tank, hours in tank, timer setting and temperature.

Each time the user depresses the display button a display flag in RAM is altered to indicate which of the five display modes has been selected. The output to display routine 212 reads this flag in order to determine which display to provide, subject to an error message override.

Figure 10:
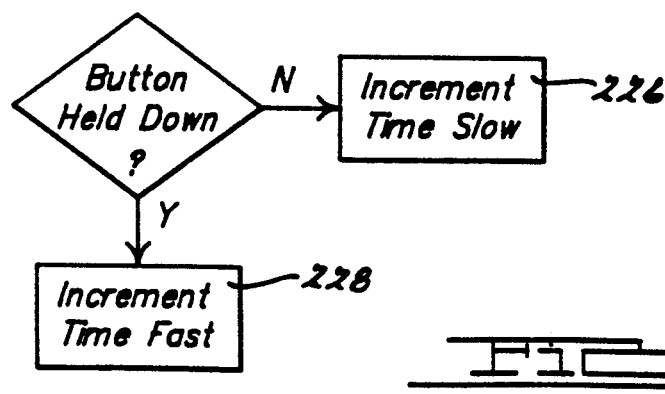
FIG. 10 is a flow chart illustrating the function of the Set Time button in accordance with the invention.

The set time button is similar in operation. Depressing the button briefly causes the desired cooking time to increase from 0 to a maximum of 9 hours and 59 minutes in 1 minute intervals. Depressing the set time button momentarily causes the time to increment in 1 minute intervals. Holding the set time button down for a predetermined longer duration causes the time to be incremented at a faster rate. FIG. 10 depicts the slow cycle and fast cycle times at steps 226 and 228.

Figure 11:
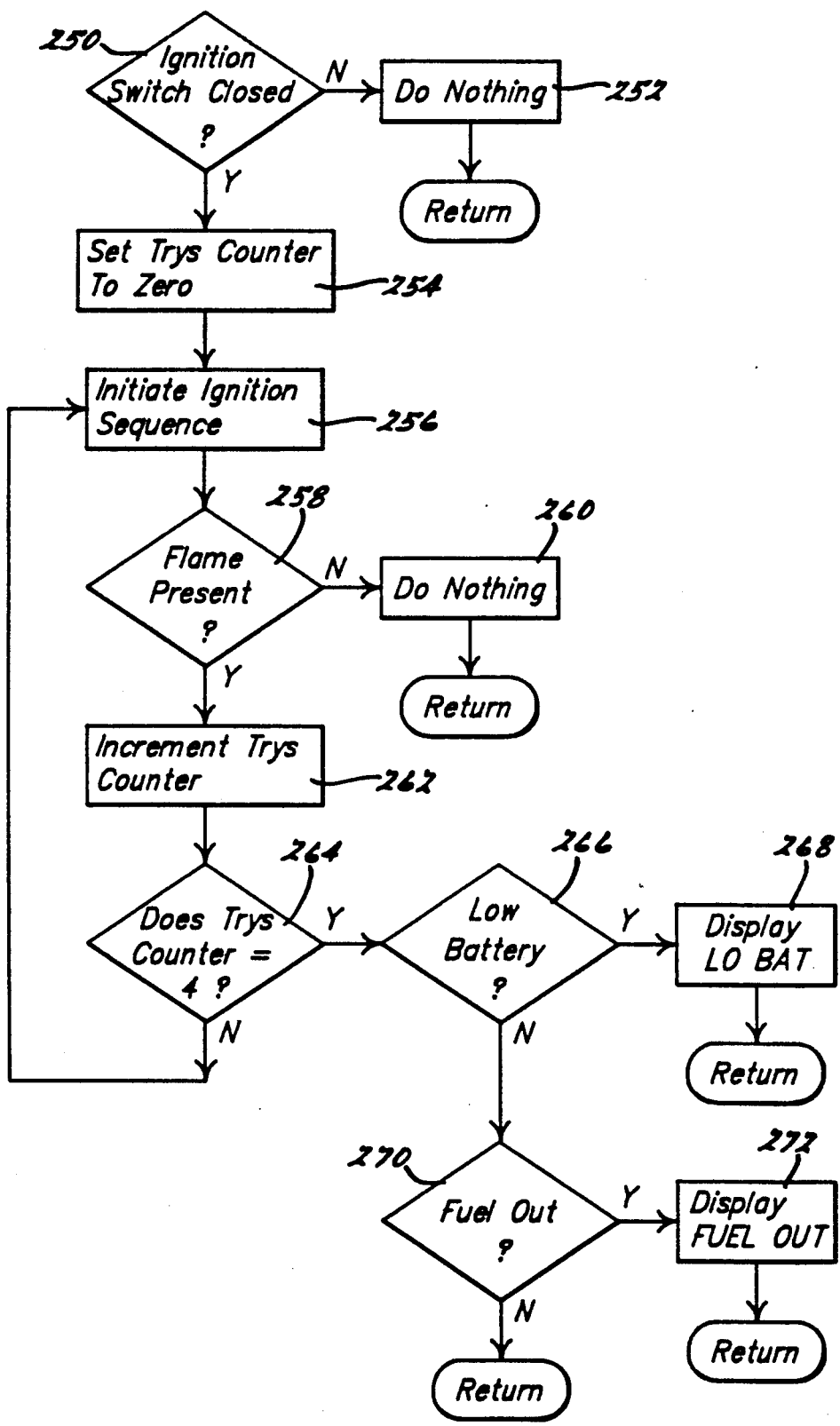
FIG. 11 is a flow chart describing the electronic ignition sequence.

Referring to FIG. 11, the ignition sequence routine is illustrated. The ignition sequence commences at step 250 by checking the ignition switch closed flag to determine whether it is appropriate to commence an ignition sequence. If the ignition flag indicates that the ignition switch is not closed, the program does nothing further. However, if the ignition switch closed flag has been set, program control continues in step 254 by setting a "tries counter" to 0 in step 254. This tries counter keeps track of how many attempts at ignition have been made. Next in step 256 the actual ignition event is initiated. Microprocessor 84 causes a predetermined address to be placed on the address bus which is decoded by address decoder 116. The decoded address provides a logic signal on line 118, causing the high voltage circuit 114 to generate a spark.

Next in step 258 the program tests the flame presence flag to determine whether the ignition sequence was successful. If so, no further action is taken as indicated at step 260. However, if a flame is not present, the tries counter is incremented at step 262 and thereafter tested in step 264 to determine whether four tries at ignition have been made. If four tries have not been made, the program control loops back to the initiate ignition sequence 256 with the now updated value in the tries counter.

On the other hand, if four tries have been made, program control proceeds to the error determination steps wherein the low battery flag is first tested in step 266. If the battery is in fact low, a low battery message is displayed in step 268. On the other hand, if a low battery condition does not exist, the program next tests at 270 to determine whether the fuel supply is depleted. This is done by checking the fuel level variable. If the fuel level is below a predetermined amount, the "Fuel Out" display is issued in step 272. If neither of these error conditions are met, the program does not alter the display.

In any event, when the program determines that a flame is not present, the audible alarm is sounded to allow the user to correct the situation. It will be understood that the routine of FIG. 11 is called by the Master Loop by the light burner routine 210. When the routine of FIG. 11 reaches any one of steps 252, 260, 268, 272 or 270, program control returns to the Master Loop.

Microprocessor 84 can display the fuel level, preferably in ⅛ increments between full and empty. In the alternative, microprocessor 84 has been programmed to compute the fuel level in terms of the time remaining before refueling is necessary. This remaining burning time is calculated arithmetically by determining the numerical value output by potentiometer 56 and by then dividing this value by a number representing the weight of fuel burned per increment of time (e.g., ounces per hour). The value from potentiometer 56 represents the weight of fuel remaining in the canister, since the weight of the canister has already been calibrated out of the equation by adjustment of potentiometer 102. This calculated value can then be displayed in lieu of the fuel level in ⅛ tank increments.

From the foregoing it will be appreciated that the present invention provides an integrated microprocessor controlled circuit for controlling ignition and for monitoring fuel levels, cooking temperatures and cooking times as well as monitoring when the grill has preheated to an appropriate starting temperature. While the invention has been described in connection with its presently preferred embodiments, it will be understood that the invention is capable of modification without departing from the spirit of the invention as set forth in the appended claims.

What is claimed is:

1. In a barbecue grill of the type employing a containment means with at least one burner disposed therein and a portable fuel source for containing and supplying fuel to said burner, the improvement comprising:

a means for determining the quantity of fuel in said fuel source and for providing an electronic fuel level signal indicative of said quantity of fuel;

an electronic monitoring and display circuit including an electronic display means for the display of human-readable information;

said electronic monitoring and display circuit being receptive of said fuel level signal and having data processing means for deriving a first numerical value indicative of the quantity of fuel in said fuel source;

said electronic monitoring and display circuit further having data processing means for deriving a second numerical value indicative of the remaining burning time of the quantity of fuel in said fuel source;

said electronic monitoring and display circuit further including means for selectively displaying said first and second numerical values in human-readable form on said electronic display means;

manually actuable time entry means for entry by a human user of a desired cooking time and wherein said electronic monitoring and display circuit further has data processing means for comparing said desired cooking time with said second numerical value and for producing a notification if the remaining burning time is inadequate to complete the desired cooking time.

2. The apparatus of claim 1 wherein said means for determining the quantity of fuel comprises means for weighing said fuel source.

3. The apparatus of claim 2 further comprising means for electronically calibrating said weighing means to account for the weight of said fuel source when empty.

4. The apparatus of claim 1 wherein said fuel source is a fuel canister, wherein said grill includes a framework and wherein said means for determining the quantity of fuel comprises means for supporting said canister, said supporting means being movable relative to said framework and having spring means connecting said framework and said supporting means and further having position responsive means coupled between said framework and said supporting means for providing a variable electrical signal indicative of the relative position and said supporting means and thereby indicative of the weight of said canister.

5. The apparatus of claim 1 wherein said electronic monitoring and display circuit includes a microprocessor.

6. The apparatus of claim 1 wherein said electronic monitoring and display circuit includes means for connection to a battery.

7. The apparatus of claim 1 wherein said display means includes a liquid crystal display.

8. The apparatus of claim 1 further comprising manually actuable switch for selectively causing one of said first and second numerical values to be displayed on said electronic display.

9. The apparatus of claim 1 wherein said electronic monitoring and display circuit further includes means for automatically and alternately displaying said first and second numerical values on said electronic display.

* * * * *